United States Patent [19]

Baker

[11] 4,182,205
[45] Jan. 8, 1980

[54] TURRET TYPE METAL WORKING MACHINE

[76] Inventor: Gary L. Baker, 527 James St., Portland, Mich. 48875

[21] Appl. No.: 900,435

[22] Filed: Apr. 27, 1978

[51] Int. Cl.² .................. B23B 3/34; B23B 39/00; B23B 39/16

[52] U.S. Cl. ........................... 82/3; 29/26 R; 29/47; 82/2 B; 82/2 D; 408/43

[58] Field of Search ............... 82/2 R, 2 B, 2 D, 3; 408/42, 43, 45; 29/26 R, 26 A, 47

[56] References Cited

U.S. PATENT DOCUMENTS

| | | | |
|---|---|---|---|
| 1,007,065 | 10/1911 | Christensen | 82/3 X |
| 1,318,116 | 10/1919 | Smith | 82/3 X |
| 1,528,226 | 3/1925 | Smith | 82/3 X |
| 2,854,868 | 10/1958 | Hake et al. | 82/2 D |
| 3,099,178 | 7/1963 | Kaiser | 82/2 D |
| 3,179,964 | 4/1965 | Grundy | 82/3 X |
| 3,389,625 | 6/1968 | Wagner | 82/2 D |

*Primary Examiner*—Harrison L. Hinson
*Attorney, Agent, or Firm*—Fisher, Gerhardt & Groh

[57] ABSTRACT

A turret type machine tool indexable to selected positions with a plurality of identical tools supported in each of the indexed positions to work on a like number of rotatable workpieces. The tool carrying turret is indexable about an axis located in the same plane as the axes of rotation of the workpieces. The turret is movable in a vertical plane between working and nonworking positions on bearings which are symmetrically disposed relative to the plane so that tool loads at the workpieces are distributed to the remainder of the machine symmetrically relative to the same common plane.

22 Claims, 5 Drawing Figures

TURRET TYPE METAL WORKING MACHINE

This invention relates to machine tools and more particularly to a turret type of metal working machine in which selected sets of tools may be brought sequentially into engagement with a similar set of workpieces.

Turret type tools are used with a plurality of different tools to conduct sequential operations on a workpiece such as drilling, honing, deburring, countersinking, buffing and the like.

Turret type tool arrangements in present use for these purposes typically have one or at most a pair of tools in each one of the operating stations and the turret is supported at one end. Accuracy in machining requires that such tools be relatively massive to insure stability between the tools and the workpieces. In the past there have been some multiple tool turrets which have been supported at opposite ends of the turret but such supports have been attached to a common bed for movement of the bed and therefore the tools towards the workpieces. With such mountings the point of the tool bearing area is offset from the point at which the tools are supported relative to the main frame of the machine. This offset relationship causes a torque or lever arm so that tool loading is offset making for inaccuracy in machining. To make machines which will perform accurately and absorb the loads, the machines become massive and therefore expensive. The more tools in each set which is in operation at one time, the greater the mass requirements of the machine become.

It is an object of the invention to provide a metal working machine wherein the loads between tool and workpiece supports are balanced.

It is another object of the invention to provide a machine tool wherein a plurality of sets of tools may be moved to selected positions in sequence to bring about sequential operation on workpieces.

Still another object of the invention is to provide a machine tool in which a plurality of sets of tools may be employed and wherein each set is made up of a plurality of identical tools.

The objects of this invention are accomplished by providing a machine tool having a main supporting frame with a tool supporting turret rotatable about a horizontal axis to selected positions and the turret is mounted for vertical sliding movement relative to the frame through means of a pair of carriages associated with the opposite ends of the turret. Each of the bearings acting between carriages and the main frame are at points spaced symmetrically to opposite sides of the turret so that loads of tools and of the workpieces are evenly distributed. The axis of the rotating workpieces, the axis of the tool supporting turret and the tools in their working position all are located in the same vertical plane. Drive means are associated to move the pair of carriages at opposite ends of the turret simultaneously and in the same direction. Also means are provided for moving the turret horizontally relative to the workpieces and also to rotate the turret to a selected position in which the turret is locked during its working operations.

These and other objects will be apparent from the following description and from the drawings in which.

Figure 1:
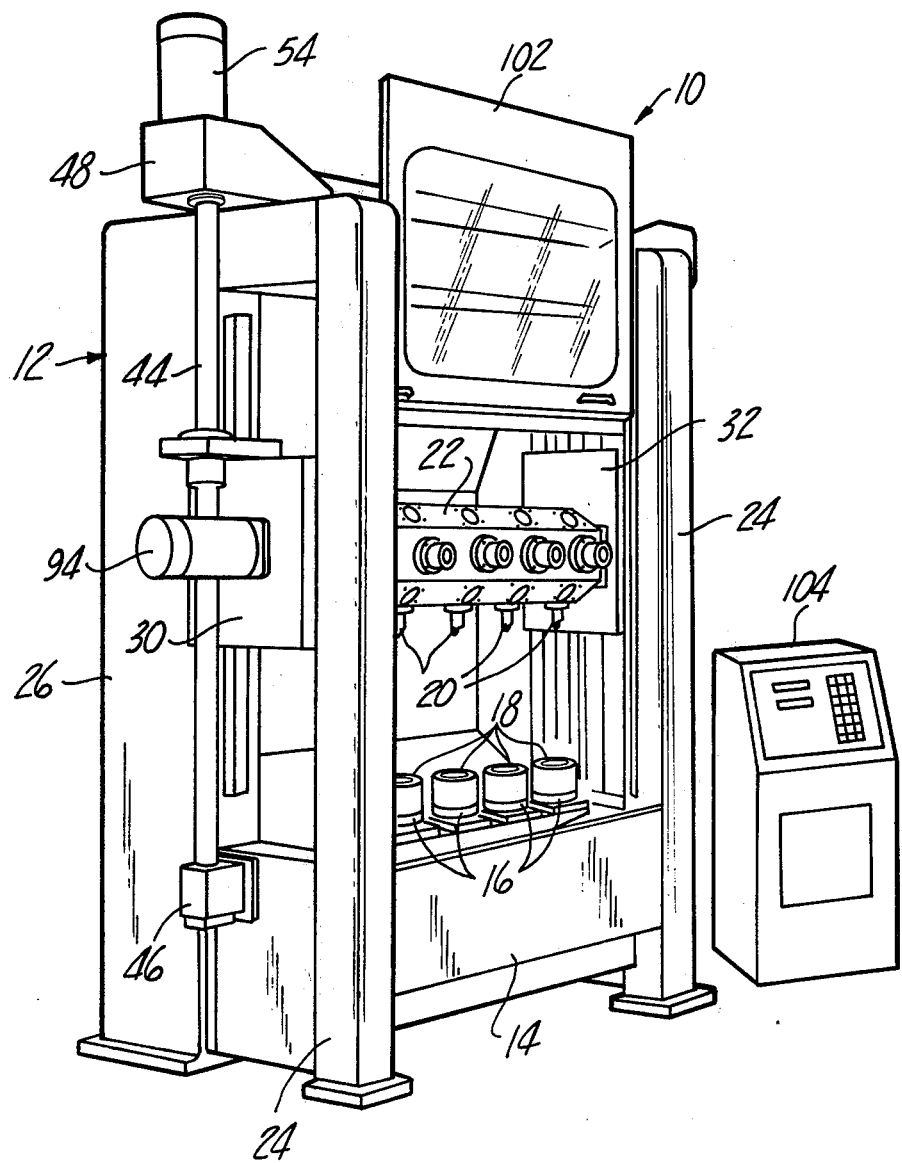
FIG. 1 is a perspective view of a metal working machine embodying the present invention.

Referring to the drawings and particularly to FIG. 1, a metal working machine embodying the invention is designated generally at 10. The machine is a multiple spindle turret type metal working machine which includes a main supporting structure or frame 12 having a base portion 14 supporting four identical spindles 16 for holding and rotating four identical workpieces 18. The workpieces 18 are worked on by four identical tools 20 supported in a stationary position on a turret 22. The turret 22 and tools 20 are movable as a unit vertically into engagement with the rotating workpieces 18 or the turret 22 can be moved horizontally for various contouring operations on the rotating workpieces 18.

The frame 12 is formed by a pair of forward columns 24 and rearward columns 26 which are rigidly connected at their lower ends to the base portion and are joined together at their upper portions to form a rigid open frame structure. The base portion 14 supports the spindles 16 for rotation about parallel, equally spaced axes which are all disposed in the same imaginary vertical plane. The spindles 16 may be of a collet type or other type which holds and rotates a workpiece during the time that it is being worked on by a metal cutting tool. The drive and the details of the spindle are not required for full understanding of the invention.

The turret 22 is generally elongated tool support having a hexagon cross-section. Each of the surfaces is adapted to hold a set of tools 20. The turret 22 can be revolved or indexed to present a selected set of tools in working position relative to the spindle 16 and workpiece 18. The various sets of tools can be indexed sequentially to the selected working position to perform typical sequential operations. In the selected position, the selected tools are disposed in the same imaginary plane in which the spindles are located so that the tools and workpieces are in working alignment with each other.

Figure 3:
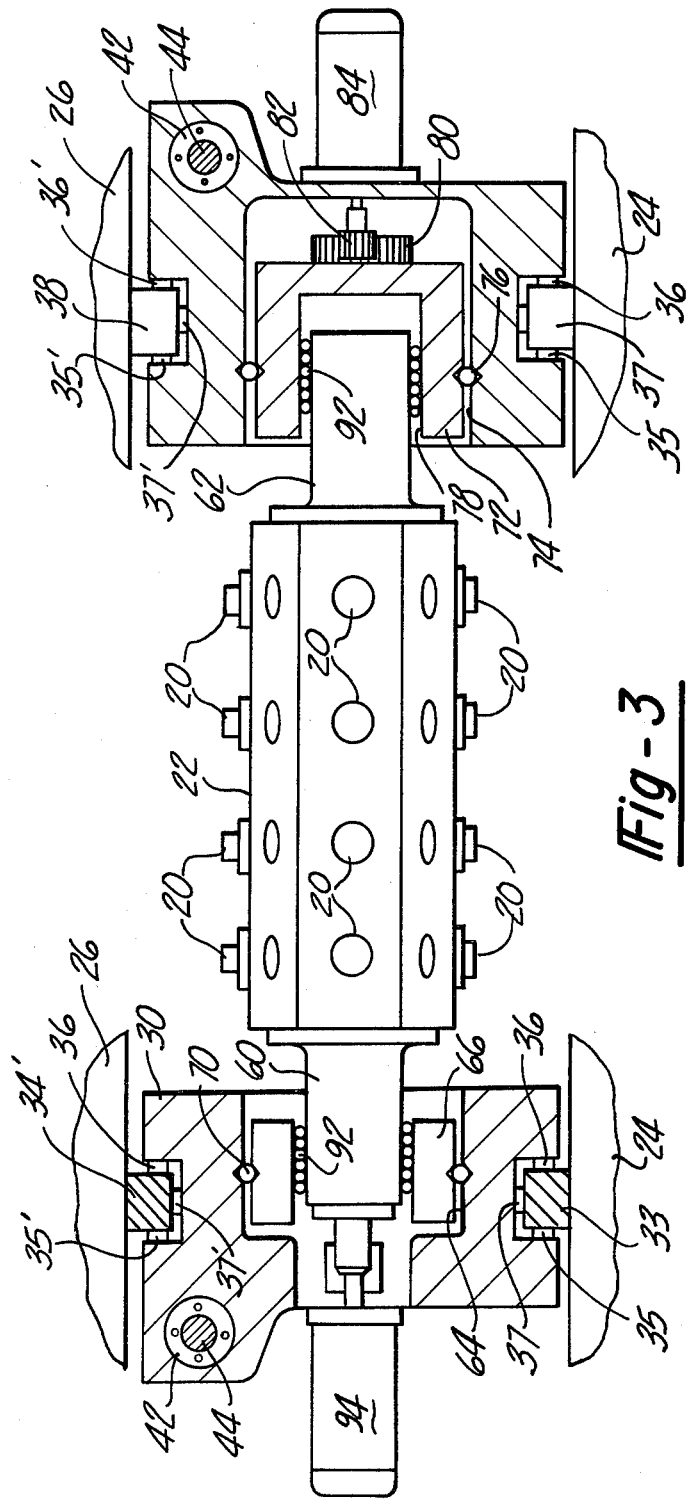
FIG. 3 is a diagrammatic top view of the mechanism seen in FIG. 2.

The turret 22 is supported relative to the frame 12 by a pair of carriages 30 and 32. Referring to FIG. 3, carriage 30 is disposed to be guided in a vertical path by rails 33 and 34 rigidly mounted on front column 24 and rear column 26, respectively. Linear roller bearing assemblies 35, 36 and 37 are disposed between the carriage 30 and the rail 33 and bearing assemblies 35', 36' and 37' are between the rail 34 and the carriage 30 to insure accurate guided movement of the carriage 30 with a minimum amount of friction. The linear bearing units use recirculating roller elements and the units are often referred to as roller packs. Such packs are provided with adjustments by which they can be very accurately positioned relative to the surfaces which they support as will be described later. The carriage 32 is identically mounted relative to a pair of guide rails 37 and 38 rigidly connected to adjoining forward and rearward columns 24 and 26.

The carriage members 30 and 32 are aligned horizontally with each other and are moved simultaneously in a vertical path relative to the rails 33, 34, 37 and 38 by a drive mechanism of the well known ball screw type.

The carriages 30 and 32 each support a ball screw nut 42 in engagement with the threads on screw shafts 44 which extend vertically at opposite sides of the machine 10. As best seen in FIG. 1 a lower end of one shaft 44 is supported by a bearing member 46 and an upper end is journaled in a housing member 48. A shaft 44 associated with the carriage 32 is similarly supported.

Figure 2:
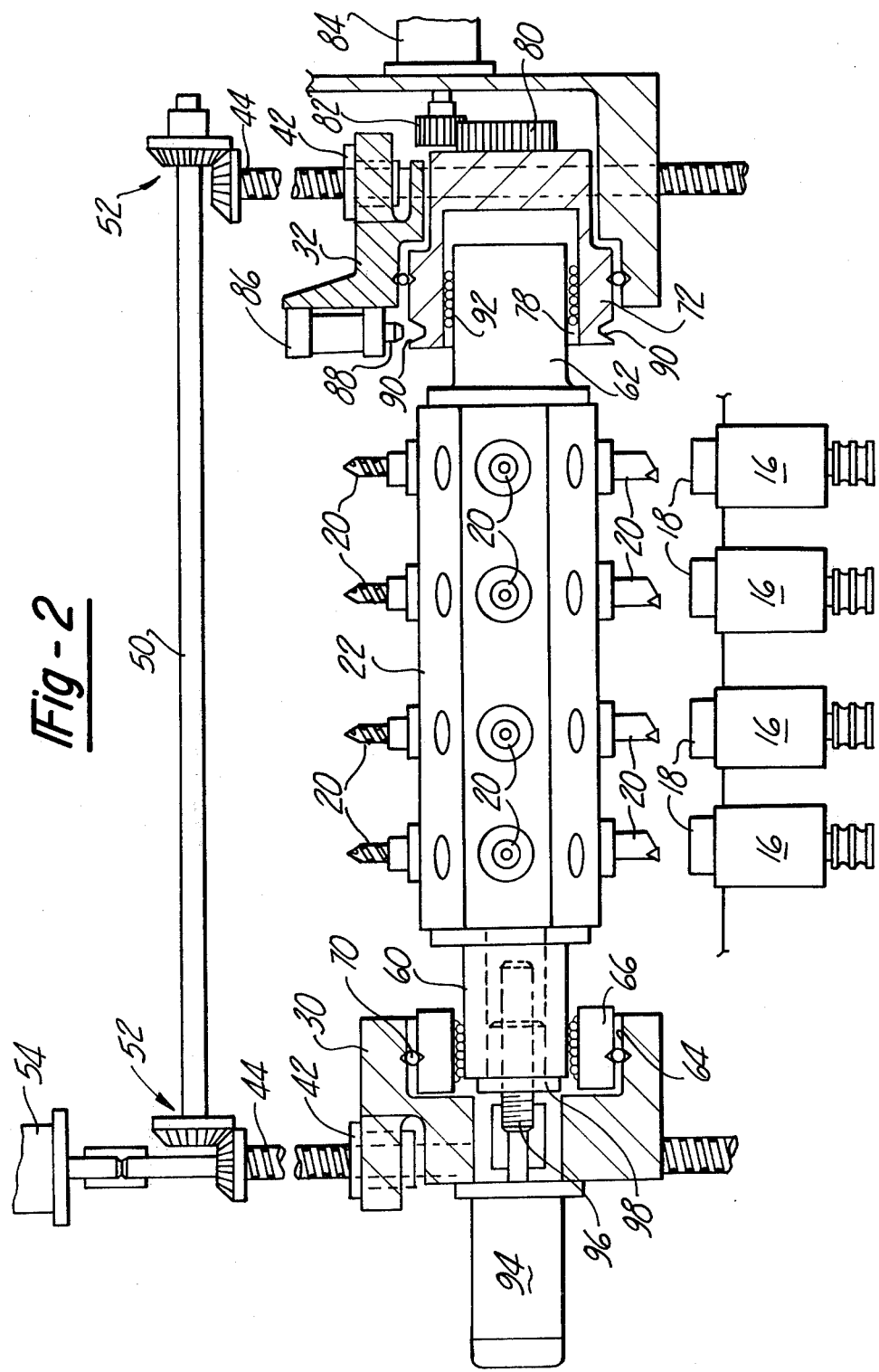
FIG. 2 is a diagrammatic elevation of the working and drive mechanism of the metal working machine seen in FIG. 1.

Referring now to FIG. 2, the carriages 30 and 32 are moved simultaneously through means of the screw shafts 44 which are linked together by a shaft 50 through right angle drives 52 at opposite ends of the shaft 50. A reversible DC drive motor 54 is connected to one of the screw shafts 44 so that driving movement of the motor is transmitted equally and simultaneously to the two screw shafts 44 to simultaneously move the carriages 30 and 32 and maintain them in horizontal alignment with each other during movement of turret 22 toward and away from the rotating workpieces 18. This is referred to as the Y-axis drive arrangement.

The turret is supported in the carriages 30 and 32 for rotational or indexing movement to position selected sets of tools and also to move horizontally during certain machining operations such as contouring. The turret 22 includes end caps 60 and 62 which have a generally rectangular cross-section as viewed from the end in FIG. 4. The rectilinear end portion of the cap 60 is received in a rectangular cavity 64 in an auxiliary carriage 66. The auxiliary carriage 66 is circular and is received in a large bore 68 of the carriage 30 and is supported therein for rotation by bearings 70.

The carriage 32 at the opposite end of the turret 22 also supports an auxiliary carriage 72 which is received in a large bore 74 and supported relative thereto by bearings 76. The auxiliary carriage 72 is provided with a rectangular cavity 78 which receives the rectangular end portion of the end cap 62. Rotation of the auxiliary carriages 66 and 72 relative to the main carriages 30 and 32, respectively, serves to rotate the turret 22.

The means by which the turret 22 can be rotated to selected position includes a gear 80 on the carriage 72 which is concentric with the axis of rotation of turret 22 and is engaged with a driving gear 82 on the output shaft of a DC reversible motor 84. When the motor 84 is energized, the drive gear 82 rotates the gear 80 and the carriage 72 which in turn rotates turret 22 and carriage 66. When the turret 22 reaches its selected position it is locked in position by an arrangement seen in FIG. 2 including a hydraulic cylinder 86 having a reciprocating rod 88, the end of which is engageable with one of the recesses 90 one of which is very accurately located relative to each of the tool carrying surfaces of the turret 22. When the turret 22 reaches its selected position actuation of the hydraulic cylinder 86 extends the rod 88 into the aligned recess 90 to insure that the turret 22 is retained in its selected position.

In any of its selected turret positions, the turret 22 can be moved horizontally along its own axis relative to the main carriages 30 and 32 and the auxiliary carriages 66 and 72. For this purpose the turret 22 has its rectangular end caps 60 and 62 supported in the rectangular recesses 64 and 78 by means of recirculating linear roller bearings 92 similar to the bearings 35, 36 and 37 supporting the carriage 30 relative to the rail 33. From FIG. 4, it will be noted that six sets of such bearings 92 are disposed between the rectangular end cap 60 and the auxiliary carriage 66. Bearings 92 are similarly arranged between the end cap 62 and the walls of the cavity 78 of the carriage 72 at the opposite end of the turret 22. The bearings 92 very accurately support the turret 22 for horizontal movement longitudinally of its axis. Movement of the turret 22 is accomplished by means of a reversible DC motor 94 drivingly connected to a ball return screw 96 threadably engaged with a ball return nut 98 supported by the end cap 60. Actuation of the DC motor 94 in one direction causes the turret 22 to move horizontally in one direction and reverse movement causes the turret 22 to move in the opposite direction. The reciprocation of the turret 22 in this manner is considered to be along its X-axis and is used for special machining operations such as contouring.

In operation, identical workpieces 18 are mounted in spindles 16 so that they are simultaneously rotated. The turret 22 is provided with a plurality of sets of tools with each set containing an identical type of tool. For example, one set may contain drill bits, a second set may contain a reamer, a third set could contain countersinks and a fourth set might contain buffing tools. The first set of tools is indexed by rotating the turret 22 so that the tools 20 and the workpieces 18 all have their axes disposed in a common imaginary plane. If necessary the turret 22 can be moved horizontally by means of the X-axis drive system including the motor 94 so that the tools 20 are in exact alignment with the axes of the workpieces 18. Thereafter the Y-axis drive motor 54 is actuated in a direction suitable to move the turret 22 downwardly towards the rotating workpieces 18. If the first set of tools is made up of drills, the turret 22 is moved downwardly a predetermined amount as determined by the depth of the holes being bored or drilled. After completion of the bores, the turret 22 is retracted by actuating the Y-axis drive motor 54 in an opposite direction and the turret 22 moves upwardly to disengage the tools 20 from the workpieces 18. The index motor 84 is then actuated to rotate the turret 22 to the next selected position bringing the second set of tools into a tool working position in the same plane as the axes of the workpieces 18. Thereafter actuation of the Y-axis drive motor 54 brings this set of tools into working engagement with the workpieces.

After the operation with the second set of tools is completed the turret 22 may be moved upwardly by actuating the Y-axis drive motor to rotate in an opposite direction. Similarly, operation with the third and fourth set of tools is conducted in the same manner after which the spindles 16 are stopped in their rotation and the finished workpieces 18 are removed.

If any of the tools are to be used for contouring or turning, the turret 22 is moved along both its X and Y axis to a selected location and thereafter the feed of the cutting tool may be along one or both axes.

It will be noted that the tools 20 and the axes of the workpieces 18 are generally in the same imaginary vertical plane. Similarly, the axis of the turret 22 is disposed in this plane and its opposite ends are supported in the carriages 30 and 32 symmetrically disposed relative to the axis of the turret. The carriages are supported to slide relative to the main frame 12 by means of bearings 35, 36, 37, 35', 36' and 37' which also are symmetrically arranged to opposite sides of the plane passing through the spindles 16. In this manner, the loads imposed on the workpieces by the tools 20 are transferred through the machine 10 symmetrically relative to the imaginary plane in which the workpieces 18 and tools 20 are located. As a result there is no imbalance or torque loads imposed on the machine 10 which can be made very accurately without requiring large masses of metal to reinforce the machine to insure that the tools are rigid relative to the workpieces 18.

Figure 4:
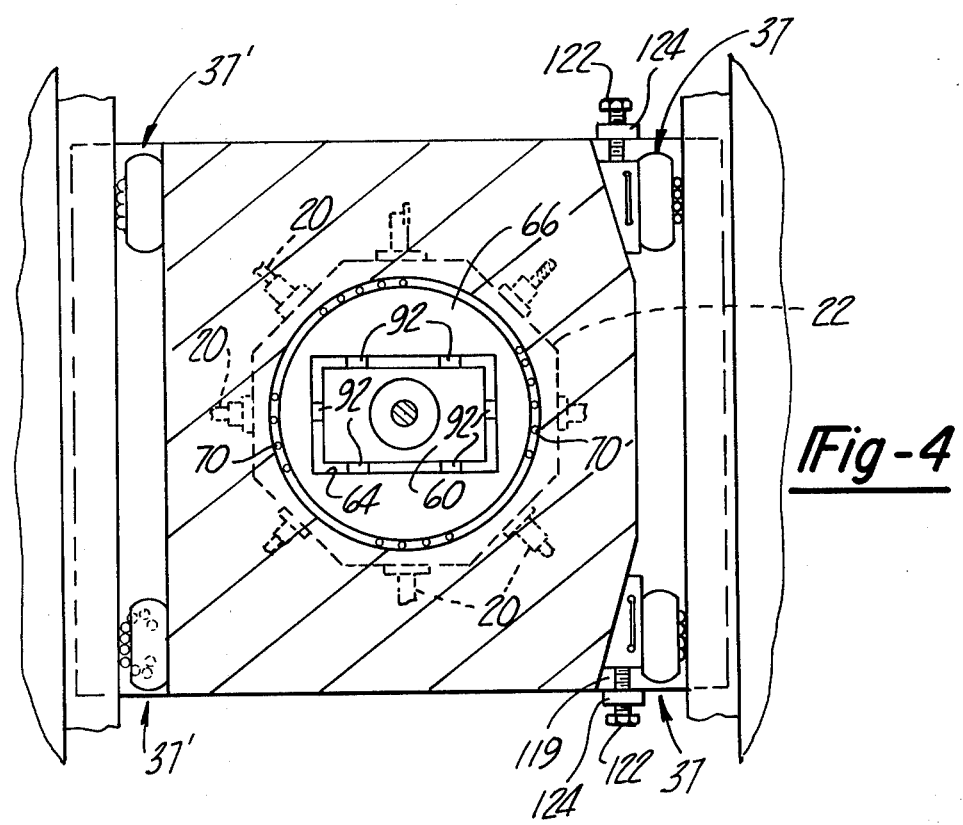
FIG. 4 is an end view of the mechanism seen in FIG. 2.
Figure 5:
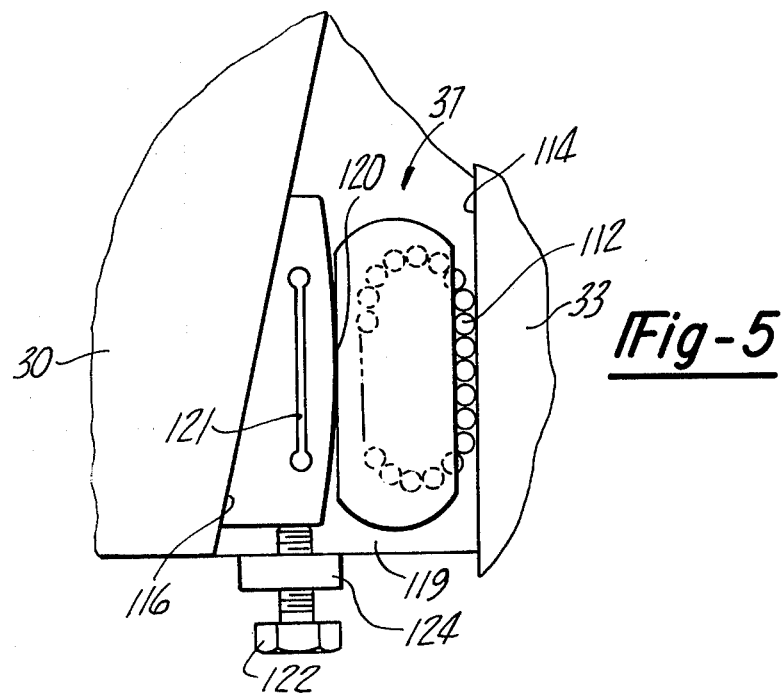
FIG. 5 is a view at an enlarged scale of a bearing assembly shown in FIG. 4.

Loads on the bearings 35, 36 and 37 between the carriages 30 and 32 and their associated guide rails 33 and 37 and bearings 35', 36' and 37' acting on guide rails 34 and 38 can be very accurately adjusted and aligned to maintain a preloading between the carriages and their associated rails. As best seen in FIG. 4 and 5, the pair of bearing assemblies 37 at one side of carriage 30 are slightly differently mounted than opposed bearing assemblies 37' at the opposite side of the carriage 30. An example of such bearings are recirculating precision roller bearings called Tychoway bearings available from Bendix Corporation. The bearing assembly 37 as seen in FIG. 5 includes a roller pack 110 having roller elements 112 which recirculate and are adapted to engage a precisioned machined surface 114 of the rail 33. Carriage 30 has an angled surface 116 on which a wedge shaped adjusting element 118 slides. The pack 110 and wedge 118 are contained within a groove 119 in the carriage 30. The pack 110 is mounted on the wedge shaped element 118 which has a crowned surface 120 that minimizes the surface contact between the wedge 118 and the pack 110. Also an elongated slot 121 is formed in element 118 and is spaced from the surface 120. An adjusting screw 122 is threadably engaged with a bracket 124 on the carriage 30. As best seen in FIG. 4, adjustment of the screw 122 upwardly moves the wedge element 118 upwardly and presses the pack 110 with the rollers 112 into tighter engagement with the surface 114 of the rail 33. Similarly, movement of the screw 122 in the opposite direction reduces the load on the rollers 112. Crowned surface 120 in engagement with the pack 110 and slot 121 permits deflection of wedge 118. Wedge 118 is made of spring steel and the crowned surface 120 and slot 121 make the element 118 act as an extremely strong spring. Adjustment of the screw 122 serves to press the rollers 112 into engagement with the surface 114 with a selected load depending on the amount of adjustment of screw 122. At the same time that the bearing 37 at one side of the guide 30 is being adjusted, the bearing 37' at the opposite side of the carriage 30 is being subjected to the same preload. Although not shown in the drawings, one bearing of each of the opposed bearing sets is provided with a similar adjustment. For example as seen in FIG. 3, bearing 36 at one side of the rail 33 may be provided with a wedge adjustment which serves to preload the bearings 35 and 36. Similarly the bearing 36' associated with the rail 34 may be provided with such a wedge adjustment so that both the bearings 35' and 36' can be preloaded. Also one bearing of each of the three pairs of opposed bearings 92 in FIG. 4 associated with the end cap 60 are provided with a wedge adjustment (not shown) so that the bearings 92 can be preloaded.

An adjustment of the type provided by the adjusting wedge 118 serves to maintain the carriage 30 in tight fitting relationship relative to the guide rails 33, 34, 37 and 38 and at the same time permits movement of the carriages with a minimum amount of friction. Similarly the bearing arrangement 92 between the end caps 60 and 62 and the auxiliary carriages 66 and 72 afford the same advantages during movement of the turret 22 along its X-axis.

The various operations of the machine tool 10 can be controlled through tape or other controls so all of the movements of the machine are produced automatically and sequentially at controlled rates of speed. In this manner once the workpieces are manually loaded into the spindles 16 and tools are properly set up in each of the selected positions on the turret 22, closing of the sliding protective gate 102 downwardly to a closed position can be used to actuate a limit switch in a well known manner to activate a tape control console 104 controlling the speed of rotation of the spindles 16 and the sequence of operation of the Y-axis drive motor 54, the X-axis drive motor 94 and the turret index motor 84 as well as the direction and speed of rotation of those motors. In this manner the tool working operation can be completely programmed and be produced automatically.

A metal working machine has been provided wherein a plurality of identical workpieces can be worked on simultaneously by a set of a plurality of identical tools and subsequently and sequentially other and different sets of tools may be brought into working position to work on the workpieces. The axes of rotation of the workpieces and the positions of the tools are located in the common plane and the tools are moved relative to the workpieces on carriages which are supported on bearings located symmetrically relative to the axis of rotation of the workpieces so that loads remain balanced thereby making for greater accuracy and minimizing the massiveness of the parts of the machine in order to obtain such accuracy.

The embodiments of the invention in which an exclusive property or privilege is claimed are defined as follows:

1. In a metal working machine comprising; a main supporting frame, means supporting a plurality of identical workpieces on said main frame for rotation about uniformly spaced parallel axes disposed in a common plane, an elongated tool support having means to support a set of tools corresponding in number and spacing to said plurality of workpieces, support means operatively disposed between said main frame and each of the opposite ends of said elongated tool support and each of (being slidably engaged with) of said support means including a pair of parallel guides supported relative to said main frame and disposed symmetrically at opposite sides of said common plane, and a carriage movably mounted on each pair of said parallel guides and supporting opposite ends of said tool support for movement of said tool simultaneously into and out of metal working engagement with said work pieces.

2. The combination of claim 1 wherein said elongated tool support is a turret rotatable about a turret axis disposed in said common plane, said turret supporting a plurality of sets of tools.

3. The combination of claim 2 wherein said turret axis is normal to said parallel axes.

4. The combination of claim 1 wherein said elongated tool support is supported relative to said main frame for movement in a metal working direction toward and away from said workpieces and axially of said turret axis.

5. The combination of claim 4 and further comprising drive means for reciprocating said tool support axially of said turret axis.

6. The combination of claim 1 and further comprising separate drive means associated with opposite ends of said elongated tool support, said drive means being connected together for simultaneously moving opposite ends of said elongated tool support in said plane.

7. The combination of claim 6 wherein each of said drive means includes a rotatable screw threadably engaged with a stationary nut associated with the opposite ends of said elongated tool support.

8. The combination of claim 1 and further comprising opposed pairs of bearing assemblies on each of said carriages and associated with each of said guide rails, one bearing assembly of each of said pairs of bearing assemblies being adjustable to impose a load between said carriages and the associated guide.

9. The combination of claim 8, wherein one bearing assembly of each pair of bearing assemblies includes an adjusting member including an inclined surface on said carriage, said bearing assembly having a complementary inclined surface, and means to slide said bearing assembly on its inclined surface to move said bearing assemblies into engagement with said guides.

10. The combination of claim 9 wherein said one bearing assembly includes a resilient member between said carriage and said rail.

11. The combination of claim 1 and further comprising a pair of auxiliary carriages rotatably supported in said first named carriages, respectively, said turret being nonrotatably supported relative to said auxiliary carriages.

12. The combination of claim 11 and further comprising means between the opposite ends of said elongated tool support and said auxiliary carriages and permitting axial movement of said tool support relative to said auxiliary carriages.

13. The combination of claim 11 and further comprising means associated with one of said auxiliary carriages for rotating the associated carriage to a selected position.

14. The combination of claim 1 and further comprising lock means supported on one of said carriages and engageable with the associated auxiliary carriage to hold said carriages in a fixed position relative to each other.

15. The combination of claim 2 wherein said turret axis is disposed horizontally and in said plane.

16. The combination of claim 1 wherein said plane is disposed vertically.

17. The combination of claim 16 wherein said turrett axis is disposed horizontally and above said workpieces.

18. The combination of claim 2 and further comprising means to rotate said turret to selected positions when said tools are out of tool cutting position and means to lock said turret in said selected position during movement of said turret to said tool cutting position.

19. A metal working machine comprising; a main supporting frame, a tool supporting turret rotatable about a horizontal axis, means supporting said turret for vertical sliding movement relative to said frame, said supporting means including a pair of carriages operatively associated with the opposite ends of said turret, respectively, each carriage being movably supported relative to said frame by bearing assemblies acting between each carriage and said main frame at points radially spaced equal amounts to opposite sides of a vertical plane passing through the axis of rotation of said turret and in the same horizontal plane, first drive means associated with one of said carriages for moving said carriage relative to said frame, second drive means associated with the other of said carriages for moving said other carriage relative to said frame, means connecting said first and second drive means together for simultaneous movement of said carriages equal distances in the same direction, tools supported from said turret and positioned in said vertical plane, and workpieces rotatably supported in said vertical plane and in alignment with said tools.

20. The combination of claim 19 wherein said first and second drive means each include a rotatable screw engaged with a stationary nut on each carriage.

21. The combination of claim 19 wherein said bearing assemblies are arranged in pairs to act in opposite directions relative to said main frame, one bearing assembly of each of said pairs of bearing assemblies including a body, an adjusting member between said body and said carriage, said adjusting member having an inclined surface slidably engaged with a complementary inclined surface on said carriage, and means to slide said adjusting member on its inclined surface to move said bearing member into engagement with said main frame.

22. The combination of claim 21 wherein said adjusting member has a crowned surface in engagement with said bearing member and a slot adjacent to said crowned surface to permit deflection of said adjusting member to resiliently bias said bearing member into engagement with said main frame.

* * * * *